United States Patent
Jian

(10) Patent No.: US 8,717,352 B2
(45) Date of Patent: May 6, 2014

(54) TRACING-TYPE STEREO DISPLAY APPARATUS AND TRACING-TYPE STEREO DISPLAY METHOD

(75) Inventor: Pei-yun Jian, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 630 days.

(21) Appl. No.: 12/981,471

(22) Filed: Dec. 29, 2010

(65) Prior Publication Data

US 2012/0154376 A1 Jun. 21, 2012

(30) Foreign Application Priority Data

Dec. 17, 2010 (CN) .......................... 2010 1 0594324

(51) Int. Cl.
*G06T 19/00* (2011.01)
(52) U.S. Cl.
USPC .......................................... 345/419; 345/426
(58) Field of Classification Search
CPC ....... G06F 12/061; G06F 9/526; G06F 11/26; G06F 12/023; G06F 12/0276; G06F 2212/702; G06T 15/06; G06T 13/20; H04N 13/0402; H04N 13/0413; H04N 13/0415; H04N 13/0477
See application file for complete search history.

(56) References Cited

U.S. PATENT DOCUMENTS 5,748,199 A * 5/1998 Palm ............................ 345/473
2007/0285528 A1* 12/2007 Mise et al. ................. 348/222.1

OTHER PUBLICATIONS

CN101895779A (translated and original); publication date Nov. 24, 2010.*
CN101908212A (translated and original); publication date Dec. 8, 2010.*

* cited by examiner

*Primary Examiner* — Kee M Tung
*Assistant Examiner* — Sing-Wai Wu
(74) *Attorney, Agent, or Firm* — Anova Law Group, PLLC

(57) ABSTRACT

An exemplary tracing-type stereo display apparatus includes a tracing member, an index member, a sub-pixel array, and a stereo display member. The tracing member is configured for obtaining a space position of a viewer. The index member is configured for obtaining an index factor according to the space position and generating an index table according to the index factor. The sub-pixel array member configured for arraying sub-pixels according to the index table. The stereo display member configured for displaying the sub-pixels arrayed according to the index table. A tracing-type stereo display method is also provided in the present disclosure.

21 Claims, 4 Drawing Sheets

TRACING-TYPE STEREO DISPLAY APPARATUS AND TRACING-TYPE STEREO DISPLAY METHOD

TECHNICAL FIELD

The present disclosure relates to a tracing-type stereo display apparatus and a tracing-type stereo display method.

BACKGROUND

A parallax characteristic of human eyes is applied by a stereo display apparatus to present stereo images having different space depth information when viewed with or without wearing special spectacles. Generally, a stereo display apparatus synthesizes a plurality of parallax views by a pixel arrangement algorithm and transmits the views to a stereo display device. Such parallax views are directly transmitted to the left and right eye of a viewer, and then synthesized a stereo image. The stereo display apparatus makes viewer have more real, more natural and more effective perception of space depth so as to obtain three-dimensional information of an object.

To observe vivid three-dimensional scenes, it is not only dependent on a stereo display apparatus but also relative to a space situation of the viewer's eyes. However, the viewer is limited only in a special view zone to obtain a desired three-dimensional scene by employing a typical stereo display apparatus. Otherwise, reversed images, ghost images and distortions may occur and desired stereo view effects may be seriously reduced.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present disclosure in detail.

Figure 1:
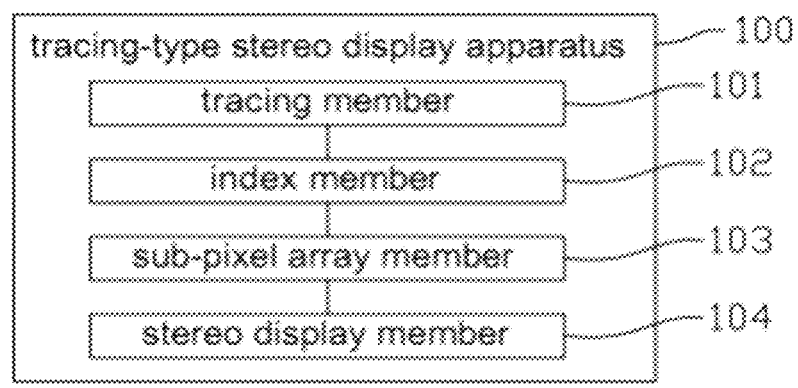
FIG. 1 is a block diagram of a tracing-type stereo display apparatus according to an exemplary embodiment of the present disclosure, the tracing-type stereo display apparatus including an image acquiring unit.

Referring to FIG. 1, a block diagram of a tracing-type stereo display apparatus according to an exemplary embodiment of the present disclosure is shown. The tracing-type stereo display apparatus 100 includes a tracing member 101, an index member 102, a sub-pixel array member 103, and a stereo display member 104. The tracing member 101 is configured for obtaining a space position of a viewer. The index member 102 is configured for obtaining an index factor according to the space position of the viewer, and generating an index table according to the index factor. The sub-pixel array member 103 is configured for arraying sub-pixels. The stereo display member 104 is configured for displaying the sub-pixels arrayed according to the index table. The tracing-type stereo display apparatus 100 will be described in details below.

The stereo display member 104 is configured for displaying stereo images for a left eye and a right eye. The images for the left eye are viewed by the left eye, and the images for the right eye are viewed by the right eye. Thus, the stereo images may be recombined by a brain of the viewer.

The tracing member 101 includes an image acquiring unit and an image processing unit. The image acquiring unit is configured for acquiring a tracing image of the viewer, and sending the tracing image to the image processing unit. The image processing unit receives the tracing image, obtains a face image from the tracing image, and determines a distance between the viewer and the image acquiring unit according to an area of the face image and an area of a standard face image.

The image acquiring unit may include a single camera, two cameras, or a plurality of cameras. In the illustrated embodiment, the image acquiring unit includes a single camera. In detail, firstly, the face image is preliminarily located by an edge detection method or a skin color detection method and so on. Secondly, the face image is accurately located by a template matching algorithmic, thus obtaining a face template matching the face image. Thirdly, a height and a width of the face image is determined according to the face template, and an area of the face image is further determined according to the height and the width of the face image.

Figure 2:
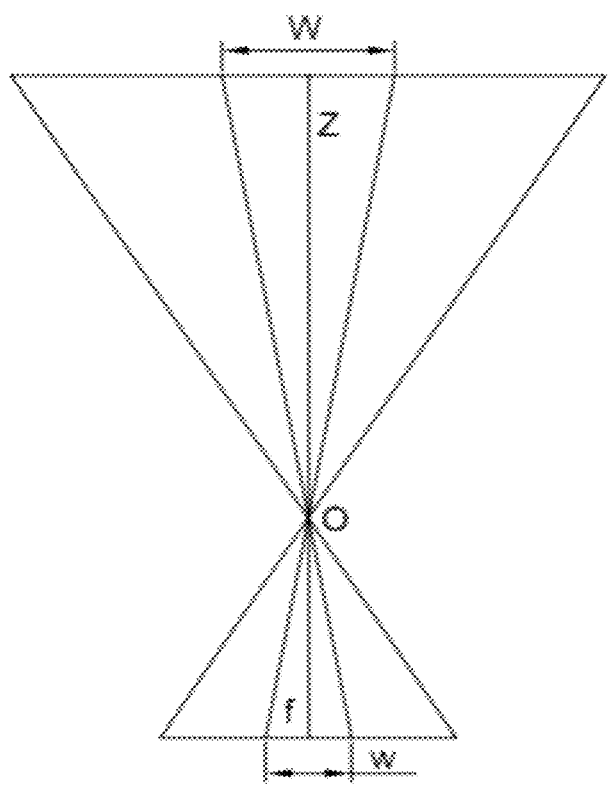
FIG. 2 is a schematic diagram for illustrating an imaging principle of the image acquiring unit of FIG. 1.

Referring to FIG. 2, a schematic diagram for illustrating an imaging principle of the image acquiring unit is shown. In FIG. 2, the capital letter "Z" represents a distance between a face of the viewer and an optics center "O" of an image system of the image acquiring unit, the lowercase letter "f" represents a distance between an imaging plane (for example, a surface of CCD array) of the image acquiring unit and the optics center "O" of the imaging system, the capital letter "W" represents a width of the face of the viewer, and the lowercase letter "w" represents a width of a face image formed on the imaging plane by the face of the viewer, then a following equality (1) is achieved:

$$W/Z = w/f \tag{1}$$

Similarly, the capital letter "H" represents a height of the face of the viewer, a lowercase letter "h" represents a height of the face image, then a following equality (2) is achieved:

$$H/Z = h/f \tag{2}$$

by equality (1)*equality (2), a following equality (3) is achieved:

$$(W*H)/(Z*Z) = (w*h)/(f*f) \tag{3}$$

$$\text{that is: } S/(Z*Z) = s/(f*f) \tag{4}$$

$$\text{i.e., } Z = f*\sqrt{S/s} \tag{5}$$

wherein the lowercase letter "s" represents the area of the face image, and the capital letter "S" represents the area of the face of the viewer, and the area of the face of the viewer "S" is preset as the area of the standard face in the present disclosure.

After the image processing unit obtains the area "s", i.e., the area of the face image by the template matching algorithm, the distance "Z" can be determined, i.e. the distance between the face of the viewer and the optic center O of the imaging system of the image acquiring unit, based on known "f" and "S". A position (x, y, z) of the left eye and the right eye of the viewer can be determined with parameters of the camera of the image acquiring unit.

In alternative embodiments of the present disclosure, the image acquiring unit and the image processing unit can be integrated as a single one for acting as the tracing member 101. Furthermore, the tracing member 101 can be further integrated with an ambient brightness detecting member and an auxiliary illuminating member. The ambient brightness detecting member and the auxiliary illuminating member may provide auxiliary illumination when an ambient brightness is insufficient. In details, the ambient brightness detecting member detects the ambient brightness, and the auxiliary illuminating member provides auxiliary illumination when the ambient brightness is insufficient. The ambient brightness detecting member and the auxiliary illuminating member may be integrated with the image acquiring member. The ambient brightness detecting member may be a photoresistance or other suitable photosensitive units. The auxiliary illuminating member may include one or more infrared illuminators.

The index factor includes at least an array period of the sub-pixels and an offset. The array period of the sub-pixels and the offset correspond to the space position of the viewer, and varies when the space position of the viewer changes.

Figure 3:
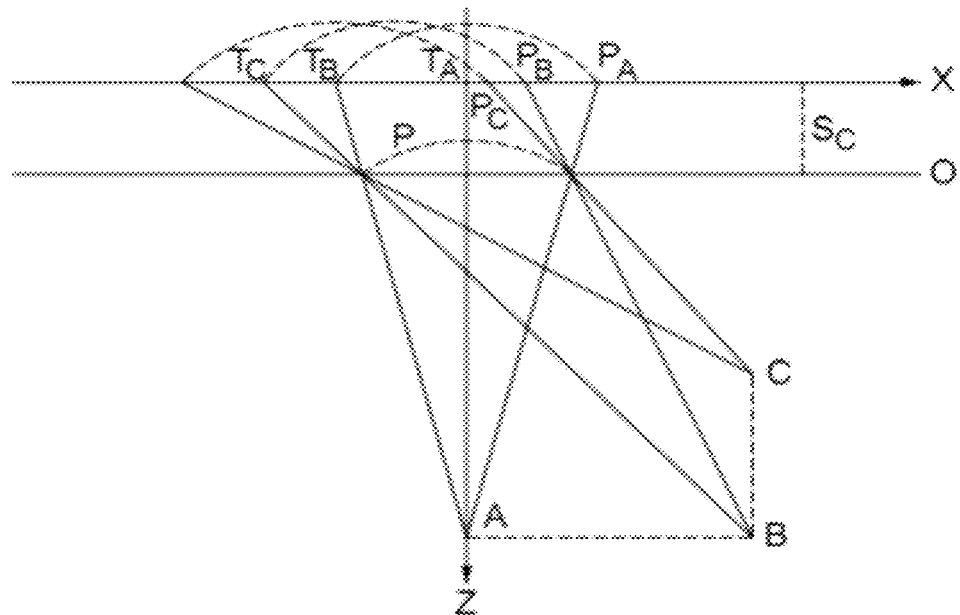
FIG. 3 is a schematic projection view when a space position of the viewer changes.

Referring to FIG. 3, the capital letter "P" represents a distance between centers of two adjacent lenses, "$S_c$" represents a distance between the lens and a display panel of the stereo display member 104, and points "A", "B" and "C" represent projection centers corresponding to different space positions of the viewers, respectively. The projection center is a center of a view zone, and is also the center of an imaginary line between the left eye and the right eye of the viewer. In a coordinate system shown in FIG. 3, the point "A" and the point "B" are on a horizontal line which is X-axis parallel to the display panel, and the point "B" and the point "C" are on a vertical line which is Z-axis perpendicular to the display panel. The space position of the viewer moves from the point "A" to the point "C", which means the viewer moves from the point "A" to the point "B" along the X-axis and further moves from the point "B" to the point "C" along the Z-axis. Then, the array period of the sub-pixels $T_C$ can be obtained by a following equality (6):

$$T_C = (Z_C * P)/(Z_C - S_C) \quad (6)$$

According to the equality (6), the array period of the sub-pixels "$T_C$" only relates to "P", "$S_C$", and "$Z_C$" which is a coordinate value of the point "C" on the Z-axis. The $\text{offset}_C$ can be achieved with the following equality (7) and the equality (8):

$$\text{offset}_C = P_C - P_A \quad (7)$$

$$P_C = ((P/2 - X_C) * S_C)/(Z_C - S_C) + P/2 \quad (8)$$

Therefore, the $\text{offset}_C$ relates to "$P_A$", "P", "$S_C$", "$X_C$", and "$Z_C$", wherein "$X_C$" represents a coordinate value of the point "C" on the X-axis, "$P_A$" represents an initial position of the point "$T_A$", and "$P_C$" represents an initial position of the point "$T_C$". In the illustrated embodiment, "$P_A$" is preset 0, therefore the $\text{offset}_C$ is a movement distance between "$P_C$" and "$P_A$". Thus, the index table may be regenerated with the $\text{offset}_C$ and "$T_C$" of the point "C", and the sub-pixels may be arrayed according to the index table to dynamically change the view zone. The projection center of the lens is then adjusted to make the center of the imaginary line between the left eye and the right eye coincide with the projection center for desired stereo effect.

Figure 4:
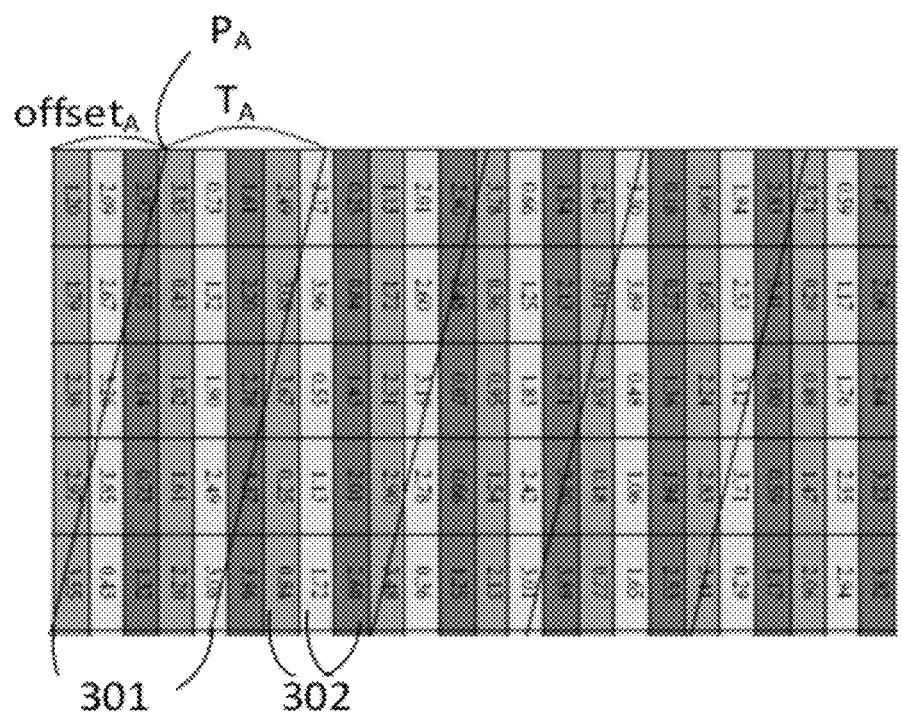
FIG. 4 is an index table corresponding to a point "A" of FIG. 3.
Figure 5:
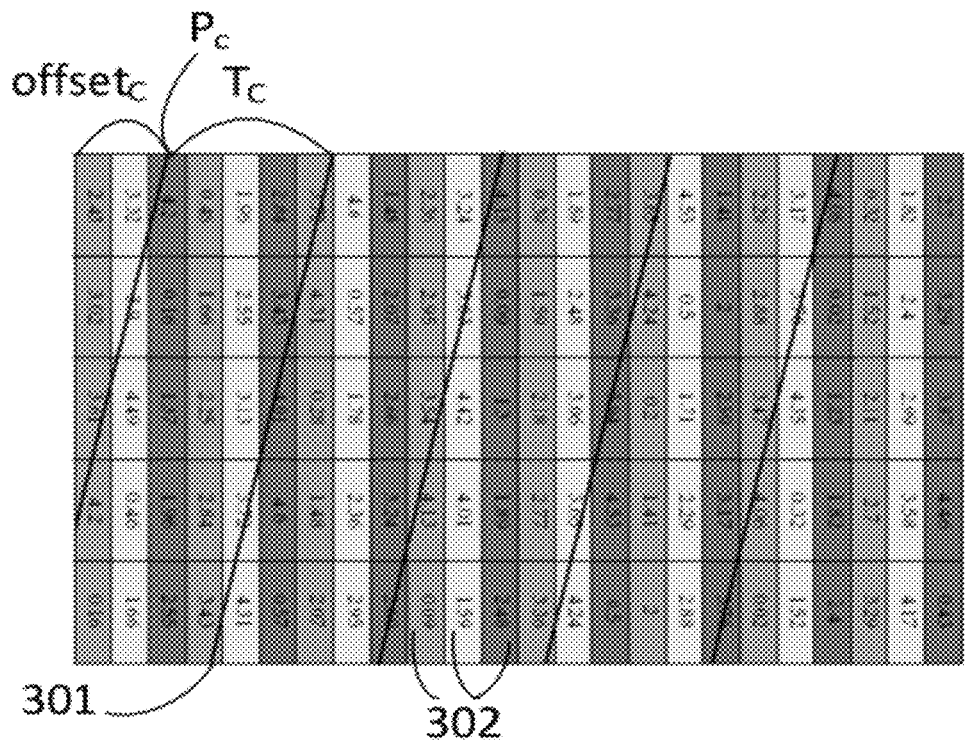
FIG. 5 is an index table corresponding to a point "C" of FIG. 4.

Referring to index tables of FIG. 4 and FIG. 5, a line 301 inclines in a direction along which the lens orients. A gridding 302 represents RGB (red, green, and blue) sub-pixels, and numbers in the gridding are index values. The index values may be floating-point values or integral indexes. The sub-pixels are horizontally arranged in an order of R-G-B from left to right. That is, a first sub-pixel of each row is the red sub-pixel, a second sub-pixel of each row is the green sub-pixel, and a third sub-pixel of each row is the blue sub-pixel. In alternative embodiments, the sub-pixels may also be arranged in an order of the B-G-R (blue-green-red) or B-R-G (blue-red-green).

In FIG. 4, the $\text{offset}_A$ represents the offset corresponding to the point "A" where the viewer is, "$T_A$" represents the array period of the sub-pixels corresponding to the point "A", and "$P_A$" represents an initial position of "$T_A$". In FIG. 5, the $\text{offset}_C$ represents the offset corresponding to the point "C" where the viewer is, "$T_C$" represents the array period of the sub-pixels corresponding to the point "C", and "$P_C$" represents an initial position of "$T_C$". When the viewer moves from the point "A" to the point "C", the tracing member 101 obtains the space position of the point "C", and sends the space position of the point "C" to the index member 102. The index member 102 obtains an index factor $\text{offset}_C$ and $T_C$ according to the space position of the point "C", and generates an index table shown in FIG. 5. The sub-pixels array member arrays the sub-pixels according to the index table of FIG. 5. The stereo display member 104 displays the sub-pixels for the left eye and the sub-pixels for the right eye according to the index table of FIG. 5. The sub-pixels for the left eye are further viewed by the left eye of the viewer, and the sub-pixels for the right eye are further viewed by the right eye of the viewer. Thus, the stereo view zone is adjusted. The number of the sub-pixels in FIG. 4 and the number of the sub-pixels in FIG. 5 are both equal to the number of the sub-pixels of the stereo display member 104, which means a resolution of the index table of FIG. 4 and FIG. 5 is equal to that of the stereo display member 104. In alternative embodiments, the index factors may be the array period of the sub-pixels, the offset, or a combination of the array period of the sub-pixels and the offset. Judged from FIG. 4 and FIG. 5, when the viewer moves from the point "A" to the point "C", the space position "$P_C$" correspondingly moves to the space position "$P_A$". A movement direction of the array period of the sub-pixels along the X-axis is opposite to that of the viewer, and a movement direction of an end of the offset along the X-axis is opposite to that of the viewer. That is, $\text{offset}_C$ is less than $\text{offset}_A$.

Figure 6:
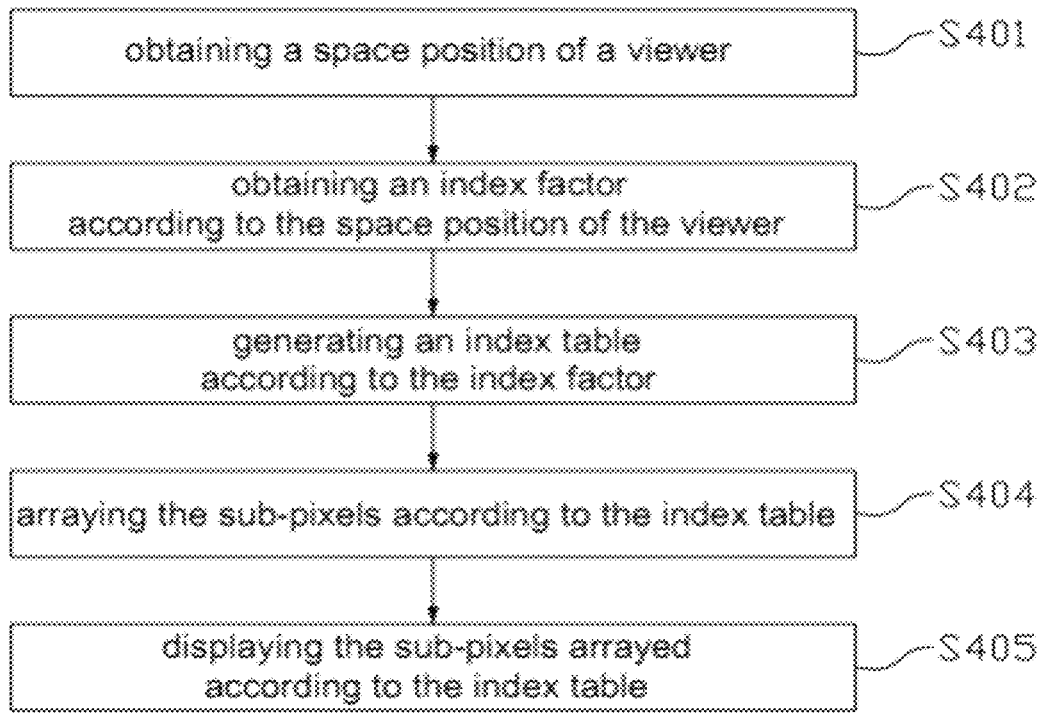
FIG. 6 is a flow chart of a tracing-type stereo display method according to an exemplary embodiment of the present disclosure.
Figure 7:
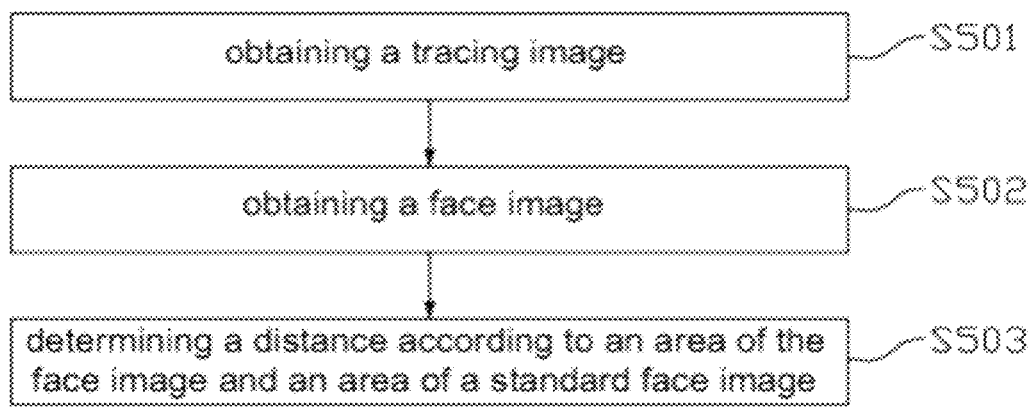
FIG. 7 is a flow chart of obtaining a space position of a viewer according to an exemplary embodiment of the present disclosure.

Referring to FIG. 6, a tracing-type stereo display method is shown. The tracing-type stereo display method includes the following steps:

step S401, obtaining a space position of a viewer as shown in FIG. 7;

step S402, obtaining an index factor according to the space position of the viewer; In the illustrated embodiment, the index factor is obtained according to the index member 102, which includes at least the array period of the sub-pixels and the offset corresponding to the space position of the viewer. Referring to FIG. 3, the capital letter "P" represents a distance between centers of two adjacent lenses, "$S_c$" represents a distance between the lens and a display panel of the stereo display member 104, and points "A", "B" and "C" represent projection centers corresponding to different space positions of the viewers, respectively. The projection center is a center of a view zone, and is also the center of an imaginary line between the left eye and the right eye of the viewer. In a coordinate system shown in FIG. 3, the point "A" and the point "B" are on a horizontal line which is X-axis parallel to the display panel, and the point "B" and the point "C" are on a vertical line which is Z-axis perpendicular to the display panel. The space position of the viewer moves from the point "A" to the point "C", which means the viewer moves from the point "A" to the point "B" along the X-axis and further moves from the point "B" to the point "C" along the Z-axis. Then, the array period of the sub-pixels $T_C$ can be obtained by a following equality (6):

$$T_C=(Z_C*P)/(Z_C-S_C) \quad (6)$$

According to the equality (6), the array period of the sub-pixels $T_C$ only relates to "P", "$S_C$", and $Z_C$ which is a coordinate value of the point "C" on the Z-axis. The offset$_C$ can be achieved with the following equality (7) and the equality (8):

$$\text{offset}_C = P_C - P_A \quad (7)$$

$$P_C = ((P/2-X_C)*S_C)/(Z_C-S_C)+P/2 \quad (8)$$

Therefore, the offset$_C$ relates to "$P_A$", "P", "$S_C$", "$X_C$", and "$Z_C$", wherein "$X_C$" represents a coordinate value of the point "C" on the X-axis, "$P_A$" represents an initial position of the point "$T_A$", and "$P_C$" represents an initial position of the point "$T_C$". In the illustrated embodiment, "$P_A$" is preset 0, therefore the offset$_C$ is a movement distance between "$P_C$" and "$P_A$". Thus, the index table may be regenerated with the offset$_C$ and "$T_C$" of the point "C", and the sub-pixels may be arrayed according to the index table to dynamically change the view zone. The projection center of the lens is then adjusted to make the center of the imaginary line between the left eye and the right eye coincide with the projection center for desired stereo effect.

step S403, generating an index table according to the index factor; Referring to index tables of FIG. 4 and FIG. 5, a line 301 inclines in a direction along which the lens orients. A gridding 302 represents RGB (red, green, and blue) sub-pixels, and numbers in the gridding are index values. The index values may be floating-point values or integral indexes. The sub-pixels are horizontally arranged in an order of R-G-B from left to right. That is, a first sub-pixel of each row is the red sub-pixel, a second sub-pixel of each row is the green sub-pixel, and a third sub-pixel of each row is the blue sub-pixel. In alternative embodiments, the sub-pixels may also be arranged in an order of the B-G-R (blue-green-red) or B-R-G (blue-red-green).

In FIG. 4, the offset$_A$ represents the offset corresponding to the point "A" where the viewer is, "$T_A$" represents the array period of the sub-pixels corresponding to the point "A", and "$P_A$" represents an initial position of "$T_A$". In FIG. 5, the offset$_C$ represents the offset corresponding to the point "C" where the viewer is, "$T_C$" represents the array period of the sub-pixels corresponding to the point "C", and "$P_C$" represents an initial position of "$T_C$". When the viewer moves from the point "A" to the point "C", the tracing member 101 obtains the space position of the point "C", and sends the space position of the point "C" to the index member 102. The index member 102 obtains an index factor offset$_C$ and $T_C$ according to the space position of the point "C", and generates an index table shown in FIG. 5. The sub-pixels array member arrays the sub-pixels according to the index table of FIG. 5. The stereo display member 104 displays the sub-pixels for the left eye and the sub-pixels for the right eye according to the index table of FIG. 5. The sub-pixels for the left eye are further viewed by the left eye of the viewer, and the sub-pixels for the right eye are further viewed by the right eye of the viewer. Thus, the stereo view zone is adjusted. The number of the sub-pixels in FIG. 4 and the number of the sub-pixels in FIG. 5 are both equal to the number of the sub-pixels of the stereo display member 104, which means a resolution of the index table of FIG. 4 and FIG. 5 is equal to that of the stereo display member 104. In alternative embodiments, the index factors may be the array period of the sub-pixels, the offset, or a combination of the array period of the sub-pixels and the offset. Judged from FIG. 4 and FIG. 5, when the viewer moves from the point "A" to the point "C", the space position "$P_C$" correspondingly moves to the space position "$P_A$". A movement direction of the array period of the sub-pixels along the X-axis is opposite to that of the viewer, and a movement direction of an end of the offset along the X-axis is opposite to that of the viewer. That is, offset$_C$ is less than offset$_A$.

step S404, arraying the sub-pixels according to the index table; In the illustrated embodiment, the sub-pixels are arrayed by the sub-pixel array member 103.

step S405, displaying the sub-pixels arrayed according to the index table; In the illustrated embodiment, the sub-pixels are displayed, and are guided to the left eye and the right eye of the viewer by the lens of the stereo display member 104, respectively.

Referring to FIG. 7, a flow chart of obtaining the space position of the viewer as described in the above step S401 is shown. In step S501, a tracing image of the viewer is obtained. For example, the image acquiring unit acquires a tracing image, and sends the tracing image to the image processing unit. Preferably, the ambient brightness is detected before acquiring the tracing image, and provides auxiliary illumination when the ambient brightness is insufficient. The tracing image can be obtained in other ways and sent by a cable or in a cordless way. In step S502, the face image is obtained from the tracing image. In detail, firstly, the face image is preliminarily located by an edge detection method or a skin color detection method and so on. Secondly, the face image is accurately located by a template matching algorithmic, thus obtaining a face template matching the face image. Thirdly, a height and a width of the face image is determined according to the face template, and an area of the face image is further determined according to the height and the width of the face image. In step S503, a distance between the viewer and the image acquiring unit is determined according to an area of the face image and an area of a standard face image.

In summary, firstly, the space position of the viewer relative to the stereo display member 104 is obtained; secondly, the index factor corresponding to the space position of the viewer is obtained according to the space position of the viewer, and the index table is generated according to the index factor; thirdly, the sub-pixels for the left eye and the sub-pixels for the right eye are respectively displayed on the stereo display member 104 according to the index table and characteristic of the lens to adjust the stereo view zone. Therefore, reversed images, ghost images and distortions may be avoided to achieve optimized stereo view effects.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A tracing-type stereo display apparatus, comprising:
a tracing member including an image acquiring unit and an image processing unit and configured for obtaining a first space position of a viewer;
an index member configured for obtaining a first index factor corresponding to the first space position and generating a first index table corresponding to the first index factor;
a sub-pixel array member configured for arraying sub-pixels according to the first index table; and
a stereo display member configured for displaying the arrayed sub-pixels,
wherein:
the tracing member is also configured to obtain a second space position of the viewer, different from the first space position of the viewer, due to a movement of the viewer;
the index member is also configured to obtain a second index factor corresponding to the second space position, based on the first index factor, and to generate a second index table corresponding to the second index factor;
the sub-pixel array member is also configured to automatically re-array the sub-pixels according to the second index table.

2. The tracing-type stereo display apparatus of claim 1, wherein:
the image acquiring unit includes a camera and is configured for acquiring a tracing image of the viewer; and
the image processing unit is configured for obtaining a face image from the tracing image and determining a distance between the viewer and the image acquiring unit according to an area of the face image and an area of a standard face.

3. The tracing-type stereo display apparatus of claim 2, wherein the image processing unit obtains a face template matching the face image, and determines an area of the face image according to the face template.

4. The tracing-type stereo display apparatus of claim 3, wherein the image processing unit obtains a height and a width of the face image according to the face template, and further determines an area of the face image according to the height and the width of the face image.

5. The tracing-type stereo display apparatus of claim 4, wherein the distance between the viewer and the image acquiring unit is governed by an equality: $Z=f*\sqrt{S/s}$, wherein the capital letter "Z" represents a distance between a face of the viewer and an optics center of an image system of the image acquiring unit, the lowercase letter "s" represents the area of the face image, and the capital letter "S" represents the area of the standard face.

6. The tracing-type stereo display apparatus of claim 1, wherein each of the first index factor and the second index factor comprises at least an array period of the sub-pixels and an offset.

7. The tracing-type stereo display apparatus of claim 1, wherein the index table comprises a plurality of index values, and the index values are floating-point values or integral values.

8. The tracing-type stereo display apparatus of claim 1, wherein a resolution of the index table is equal to that of the stereo display member.

9. The tracing-type stereo display apparatus of claim 6, wherein the array period of the sub-pixels is governed by an equality: $T_C=(Z_C*P)/(Zc-Sc)$, wherein "$T_C$" represents the array period of the sub-pixels, the capital letter "P" represents a distance between centers of two adjacent lenses of the stereo display member, "Sc" represents a distance between the lens and a display panel of the stereo display member, and "Zc" represents a coordinate value of a space position "C" on a Z-axis.

10. The tracing-type stereo display apparatus of claim 9, wherein the offset is governed by an equality: $\text{offset}_c=P_C-P_A$ and an equality: $P_C=((P/2-X_C)*S_C)/(Z_C-S_C)+P/2$, where offset represents the offset, "$X_C$" represents a coordinate value of the space position "C" on an X-axis, "$P_A$" represents the first space position, and "$P_C$" represents the second space position.

11. The tracing-type stereo display apparatus of claim 10, wherein, when the viewer moves, a movement direction of the array period of the sub-pixels along the X-axis is opposite to that of the viewer, and a movement direction of an end of the offset along the X-axis is opposite to that of the viewer.

12. A tracing-type stereo display method, comprising the following steps:
obtaining a first space position of a viewer;
obtaining a first index factor corresponding to the first space position of the viewer;
generating an index table a first index table corresponding to the first index factor and arraying sub-pixels according to the first index table;
displaying the arrayed sub-pixels arrayed;
obtaining a second space position of the viewer, different from the first space position of the viewer, due to a movement of the viewer;
obtaining a second index factor corresponding to the second space position, based on the first index factor;
generating a second index table corresponding to the second index factor;
automatically re-arraying the sub-pixels according to the second index table.

13. The tracing-type stereo display method of claim 12, wherein obtaining the first space position of the viewer comprises:
obtaining a tracing image of the viewer using a camera;
obtaining a face image from the tracing image; and
determining a distance between the viewer and an image acquiring unit which acquires the tracing image of the viewer according to an area of the face image and an area of a standard face.

14. The tracing-type stereo display method of claim 13, wherein the distance between the viewer and the image acquiring unit is governed by an equality: $Z=f*\sqrt{S/s}$, wherein the capital letter "Z" represents a distance between a face of the viewer and an optics center of an image system of the image acquiring unit, the lowercase letter "s" represents the area of the face image, and the capital letter "S" represents the area of the standard face.

15. The tracing-type stereo display method of claim 14, wherein obtaining the face image from the tracing image comprises:
preliminarily locating the face image;
obtaining a face template matching the face image and determining a height and a width of the face image; and
determining the area of the face image according to the height and the width thereof.

16. The tracing-type stereo display method of claim 12, wherein each of the first index factor and the second index factor comprises at least an array period of the sub-pixels and an offset.

17. The tracing-type stereo display method of claim 12, wherein the index table comprises a plurality of index values, and the index values are floating-point values or integral values.

18. The tracing-type stereo display method of claim 12, wherein a resolution of the index table is equal to that of a stereo display member which displays the sub-pixels arrayed according to the index table.

19. The tracing-type stereo display method of claim 16, wherein the array period of the sub-pixels is governed by an equality: $T_C=(Z_C*P)/(Z_C-S_C)$, wherein "$T_C$" represents the array period of the sub-pixels, the capital letter "P" represents a distance between centers of two adjacent lenses of the stereo display member, "Sc" represents a distance between the lens and a display panel of the stereo display member, and "Zc" represents a coordinate value of a space position "C" on a Z-axis.

20. The tracing-type stereo display method of claim 19, wherein the offset is governed by an equality: $offset_c=P_C-P_A$ and an equality: $P_C=((P/2-X_C)*S_C)/(Z_C-S_C)+P/2$, where offset represents the offset, "$X_C$" represents a coordinate value of the space position "C" on an X-axis, "$P_A$" represents the first space position, and "$P_C$" represents the second space position.

21. The tracing-type stereo display method of claim 20, wherein when the viewer moves, a movement direction of the array period of the sub-pixels along the X-axis is opposite to that of the viewer, and a movement direction of an end of the offset along the X-axis is opposite to that of the viewer.

* * * * *